United States Patent
Chew et al.

(10) Patent No.: US 11,672,241 B2
(45) Date of Patent: Jun. 13, 2023

(54) ADAPTOR FOR SECURING AN EQUIPMENT TO A FISHING REEL

(71) Applicants: Shimano Components (Malaysia) SDN. BHD., Johor (MY); Shimano Inc., Sakai (JP)

(72) Inventors: Chun Wee Chew, Johor (MY); Kenji Yoshida, Sakai (JP)

(73) Assignees: Shimano Components (Malaysia) SDN. BHD., Johor (MY); Shimano, Inc., Sakai (JP)

( * ) Notice: Subject to any disclaimer, the term of this patent is extended or adjusted under 35 U.S.C. 154(b) by 174 days.

(21) Appl. No.: 17/125,711

(22) Filed: Dec. 17, 2020

(65) Prior Publication Data

US 2021/0235681 A1    Aug. 5, 2021

(30) Foreign Application Priority Data

Jan. 30, 2020    (MY) ............................ PI2020000516

(51) Int. Cl.
*A01K 97/06*        (2006.01)

(52) U.S. Cl.
CPC .................................. *A01K 97/06* (2013.01)

(58) Field of Classification Search
CPC ........ A01K 97/06; A01K 97/00; A01K 99/00; A01K 87/00; A01K 87/06; A01K 87/009
See application file for complete search history.

(56) References Cited

U.S. PATENT DOCUMENTS

| | | | | |
|---|---|---|---|---|
| 4,428,139 A | * | 1/1984 | Henze | A01K 89/015 43/20 |
| 6,591,540 B1 | * | 6/2003 | Chargois | A01K 97/10 43/21.1 |
| 2007/0124983 A1 | * | 6/2007 | Leyden | A01K 87/06 43/22 |
| 2012/0255215 A1 | * | 10/2012 | Cooper | A01K 87/08 43/20 |

* cited by examiner

*Primary Examiner* — Joshua J Michener
*Assistant Examiner* — Henry Hooper Mudd
(74) *Attorney, Agent, or Firm* — United IP Counselors, LLC

(57) ABSTRACT

An adaptor for securing an equipment to a fishing reel is disclosed. The adaptor includes a plate having a first opening configured to receive a male fastener of a fastening assembly to be mounted onto the fishing reel, and a second opening configured to receive the equipment.

9 Claims, 3 Drawing Sheets

ADAPTOR FOR SECURING AN EQUIPMENT TO A FISHING REEL

CROSS-REFERENCE TO RELATED APPLICATIONS

This application claims priority to Malaysian Patent Application No. PI2020000516, filed Jan. 30, 2020. The contents of that application are incorporated by reference herein in their entirety.

TECHNICAL FIELD

This invention relates to an adaptor used as a fishing accessory, particularly for use to secure an equipment to a fishing reel.

BACKGROUND ART

Typically, anglers require fishing tackle such as a rod, reel, fishing line, hook and lure or bait for catching fish. These fishing tackles are assembled prior to commencing fishing activity at the site of fishing that can be a boat, shore, jetty or pier. The reel is mounted to the rod, while the fishing line is wound up on the spool of the reel. With the hook being attached to the end of the fishing line, the lure or bait is also added thereto for attracting fish.

If installation of the fishing tackle at a fixed position in the site of fishing is needed, safety lines can be secured between the rod and/or reel and a desired anchoring spot for preventing loss of the fishing tackle, especially the rod and reel. In addition, for joining two different sets of fishing tackle setups, the safety line can be applied to connect the fishing tackle setups together.

Despite the assembling of different fishing tackles to form a complete fishing tackle setup, or installing the fishing tackle at the fishing site using a safety line, losing of fishing tackle can easily happen, particularly to flexible tackle, or terminal tackle attached to the flexible tackle. Flexible tackle includes line, string, rope, chain and strap that is utilized for holding terminal tackles, usually at the end of the flexible tackle. The terminal tackle can be a hook, ring or clip. Since the flexible tackle is vulnerable, it is prone to breakage and the terminal tackle attached to it will be loss easily. Further, the flexible tackle can become entangled or intertwine with other tackle such as the rod. Besides that, with the end of the flexible tackle including the terminal tackle attached thereto being left hanging and without being fixed to a position, the flexible tackle and the terminal tackle can easily be damaged.

Currently, the approach for solving these issues is to utilize the hole at the reel clamp or rod clamp for the attachment of the flexible tackle or the terminal tackle. The flexible tackle is tied to the hole of the reel clamp or rod clamp, whereas the terminal tackle is secured to the hole through hooking to or surrounding the periphery of the hole. However, the reel clamp and rod clamp have a thick body that causes difficulties for the tackle to be attached to it. An additional accessory like a ring is required to be fixed around the periphery of the hole such that the tackle can be secured to the additional accessory having a thinner dimension instead. The additional accessory serves as a link for the tackle to be attached to the hole of reel clamp or rod clamp. To attach multiple tackles to the hole of the reel clamp or rod clamp, sometimes a plurality of additional accessories is required. Nevertheless, the use of the hole of the reel clamp or rod clamp will not be possible if there is no extra hole that is unoccupied to for attachment of the flexible tackle, terminal tackle or combination thereof.

BRIEF SUMMARY

An object of the present invention is to provide an adaptor and an adaptor kit having the adaptor for use as a fishing accessory in order to secure an equipment to a fishing reel. Another object of the present invention is to provide an adaptor that can be detachably attached to any protruding element of the fishing reel such as a bolt. Such an adaptor makes use of an existing element of the fishing reel to allow attachment of equipment, especially fishing equipment to the reel. On the other hand, it is an object for the adaptor kit that comes with mounting elements including male and female fasteners to be secured to the fishing reel without utilizing existing element of the fishing reel. The adaptor kit is suitable for use when there is no applicable protruding element of the fishing reel for the attachment of the adaptor to the reel. The present invention allows equipment such as flexible tackle in the form of string, line, strap, chain and rope to be secured to the adaptor, as well as terminal tackle such as hook, ring and clip to be engaged to the adaptor, thereby solving issues pertaining to possible loss of fishing equipment, entanglement of the fishing equipment especially the flexible tackle and damage of fishing equipment. Further, such an adaptor eliminates the need to utilize holes of the fishing reel for securing the equipment that requires additional accessories such as rings for the attachment of fishing equipment due to the thick periphery of the fishing reel holes. These functions of the adaptor fulfill objects of the present invention to offer convenient and easy attachment of equipment as well as provide protection of the equipment from being damaged. Ensuring safe use of the adaptor and the adaptor kit is also an object of the present invention.

At least one of the preceding objects is met, in whole or in part, by the present invention, in which one aspect of the present invention provides an adaptor for securing an equipment to a fishing reel that comprises a plate having a first opening configured to receive a male fastener of a fastening assembly to be mounted onto the fishing reel, and a second opening configured to receive the equipment.

In an aspect of the invention, the adaptor is mounted to a foot portion of the fishing reel.

Based on an aspect of the invention, the adaptor is formed with a pair of stoppers at opposing sides of the plate, the stoppers protrude in a direction perpendicular to a surface of the plate so as to contact a foot portion of the fishing reel.

Preferably, the plate is divided into a mounting portion formed with the first opening, and a receiving portion formed with the second opening, the receiving portion is inclined at an angle relative to the mounting portion.

It is preferred that the equipment includes any one or a combination of a line, strap, string, chain, rope, hook, ring and clip.

Another aspect of the present invention is to provide an adaptor kit for securing an equipment to a fishing reel, comprising an adaptor including a plate having a first opening, and a second opening configured to receive the equipment; and a fastening assembly including a male fastener to be inserted through the first opening of the adaptor to mount the plate onto the fishing reel.

According to an aspect of the invention, in the adaptor kit, the fastening assembly further includes any one or a combination of a primary female fastener configured to secure the plate to the male fastener, a washer disposed in between the primary female fastener and the plate, and a secondary female fastener being disposed adjacent to the first female fastener and configured to enclose an end portion of the male fastener.

Based on another aspect of the invention, in the adaptor kit, the fastening assembly further includes any one or a combination of a first primary female fastener, a first washer disposed in between the first primary female fastener and a first surface of the plate, a second washer disposed on another surface of the plate, a second primary female fastener being disposed adjacent to the second washer, and a secondary female fastener configured to enclose an end portion of the male fastener.

It is preferred that the adaptor is formed with a pair of stoppers at opposing sides of the plate, the stoppers protrude in a direction perpendicular to the surface of the plate so as to contact a foot portion of the fishing reel where the adaptor is mounted.

The plate is preferred to be divided into a mounting portion formed with the first opening, and a receiving portion formed with the second opening, the receiving portion is inclined at an angle relative to the mounting portion.

Preferably, the equipment includes any one or a combination of a line, strap, string, chain, rope, hook, ring and clip.

BRIEF DESCRIPTION OF THE DRAWINGS

This invention will now be described in greater detail with reference to the accompanying drawings.

DETAILED DESCRIPTION

For a better understanding of the invention, preferred embodiments of the invention that are illustrated in the accompanying drawings will be described in detail.

Disclosed herein is an adaptor 100 for securing an equipment to a fishing reel 300. As a fishing accessory, the adaptor 100 can be detachably mounted to any protruding element of the fishing reel 300 as a male fastener 201. With a fastening assembly, the adaptor 100 can be fastened to the protruding member. The present invention also introduces an adaptor kit that includes the adaptor 100 and the fastening assembly. Although the equipment can be any object such as a name tag, keychain and electronic device, it is preferred that the equipment is a fishing equipment. It is understood that the term 'fishing equipment' includes fishing tackle and gear that are used for fishing activity by anglers, and is not limited to a flexible tackle such as equipment in long and narrow form such as a line, strap, string, chain, cable, rope and stripe, as well as terminal tackle which is equipment attached to the end of the flexible tackle such as a hook, clip and ring. Exemplary flexible tackle includes a strap of a fishing harness, and a safety line for connecting different fishing tackle setups, or for installing a fishing tackle setup at a fixed position in a fishing site.

Figure 1:
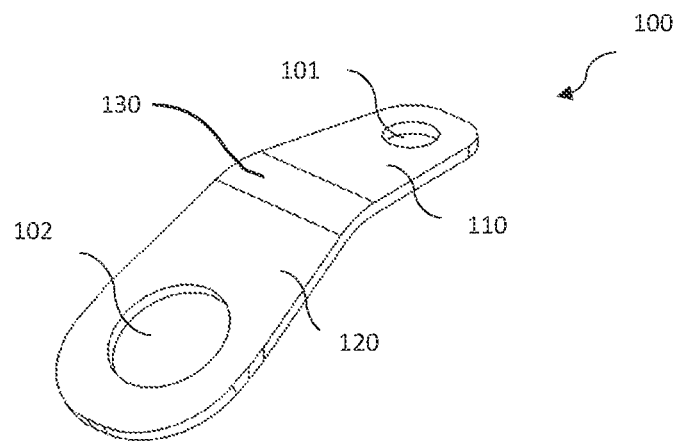
FIG. 1 is a perspective view of a first embodiment of the adaptor.
Figure 2:
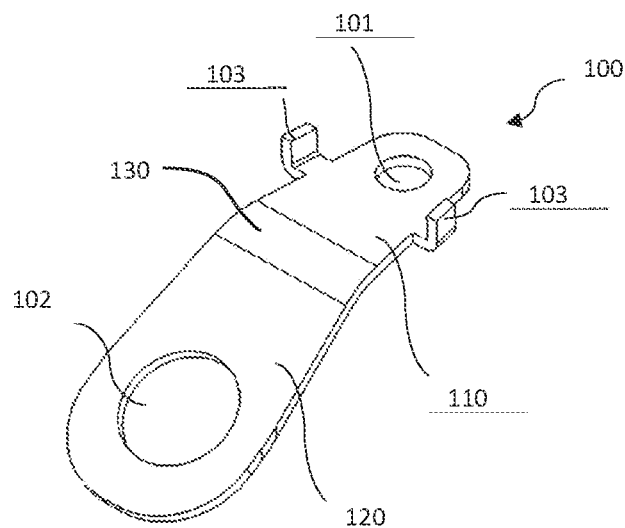
FIG. 2 is a perspective view of a second embodiment of the adaptor that is equipped with stoppers.

Referring to FIG. 1 and FIG. 2, the adaptor 100 comprises a plate having a first opening 101 for receiving a male fastener 201 of the fastening assembly to be mounted onto the fishing reel 300, and a second opening 102 adapted for receiving the equipment. The plate is divided into a mounting portion 110 formed with the first opening 101, and a receiving portion 120 formed with the second opening 102. The plate further includes a curved portion 130 which is curved and connects the mounting portion 110 and the receiving portion 120 to be inclined at an angle relative to each other. Both openings 101, 102 are located at distal ends of their respective portions 110, 120. To ease mounting of the plate to the fishing reel 300, the receiving portion 120 is inclined at an angle relative to the mounting portion 110 such that it is biased away from the fishing reel 300. Such inclination of the receiving portion 120 also provides more space for the engagement of the equipment to the second opening 102 at the receiving portion 120.

The flexible tackle can be tied to the first opening 101, making the adaptor 100 a keeper for the flexible tackle. For example, when a safety line is tied to the first opening 101, the adaptor 100 works as a safety line keeper. The terminal tackle such as hook, ring or clip can be engaged around the periphery of the first opening 101 such that the adaptor 100 functions as a keeper for the terminal tackle. When a hook is attached to the first opening 101, the adaptor 100 functions as a hook keeper. For safe use of the adaptor 100, it is preferred that the plate is constructed with bullnose edges to provide smooth and rounded edges instead of sharp edges that can easily cause injuries or damages to other equipment.

The adaptor 100 shown in FIG. 1 is a first embodiment of the adaptor 100 where there is no stopper 103 available at the plate. FIG. 2 illustrates a second embodiment of the adaptor 100 that is formed with a pair of stoppers 103 at opposing sides of the plate. In this embodiment, the stoppers 103 protrude in a direction perpendicular to the surface of the plate so as to contact the fishing reel 300, in particular a foot portion 310 of the fishing reel 300. The purpose of the stoppers 103 is for stabilizing the adaptor 100 to reduce vibration of the adaptor 100 induced by operation of the fishing reel 300 or other apparatus during fishing activity upon being mounted to the fishing reel 300. With the stoppers 103 being positioned at both opposing sides of the plate, load of the adaptor 100 can be equally distributed between both sides of the plate.

It is preferred that the adaptor 100 is mounted onto the foot portion 310 of the fishing reel 300 which is the base of the fishing reel 300 by using the fastening assembly. The male fastener 201 can be an element of the fishing reel 300 or an element provided by the adaptor kit. Other than the male fastener 201 that is inserted through the first opening 101, the fastening assembly also comprises a primary female fastener 202 for securing the plate to the male fastener 201. Optional elements of the fastening assembly include at least one washer 203 for reducing vibration and preventing loosening of the adaptor 100 and the primary female fastener, and a secondary female fastener 204 to further secure the connection of the adaptor 100 to the male fastener 201.

Figure 3:
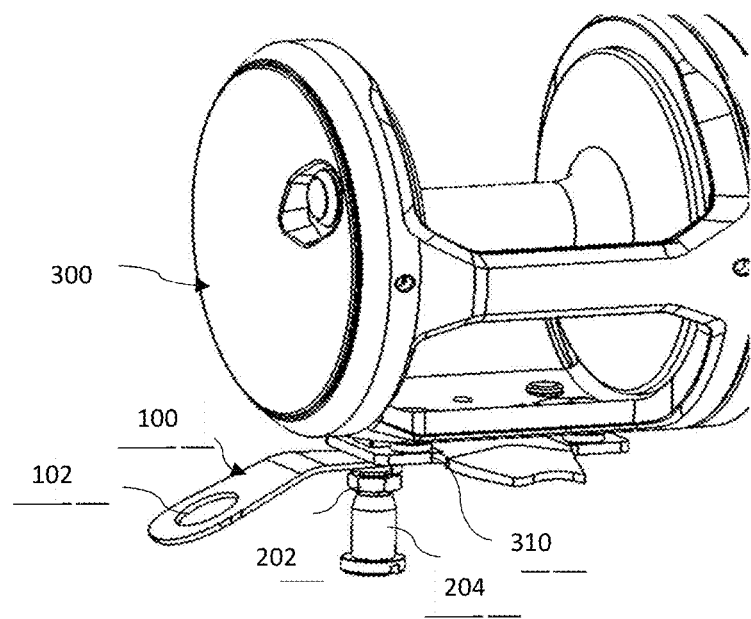
FIG. 3 is a perspective view of a first configuration of the fastening assembly for securing the first embodiment of the adaptor to the fishing reel.
Figure 4:
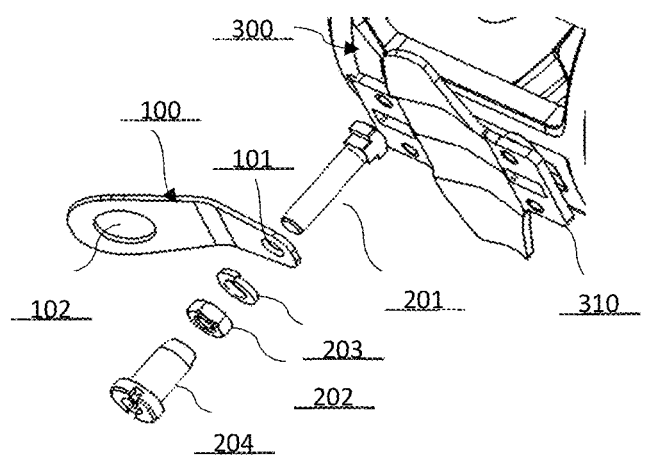
FIG. 4 is an exploded view of a second configuration of the fastening assembly for securing the first embodiment of the adaptor to the fishing reel.

Since the first embodiment of the adaptor 100 has no stoppers 103, washer 203 is preferred to be included in the fastening assembly. FIG. 3 depicts a first configuration of the fastening assembly for securing the first embodiment of the adaptor 100 to the fishing reel 300. According to this configuration, the fastening assembly employs the male fastener 201, primary female fastener 202, washer 203 and secondary female fastener 204. With reference to FIG. 4 that shows the exploded view of this configuration, the adaptor 100, washer 203, primary female fastener 202, and secondary female fastener 204 are arranged in this sequence with the adaptor 100 being closest to the fishing reel 300. The washer 203 is sandwiched between the adaptor 100 and the primary female fastener 202, whereas the secondary female fastener 204 is adjacent to the primary female fastener 202 and is configured to enclose an end portion of the male fastener 201 for aesthetic purposes and to prevent the exposure of the male fastener 201 which can cause injury, or damage to other equipment.

Figure 5:
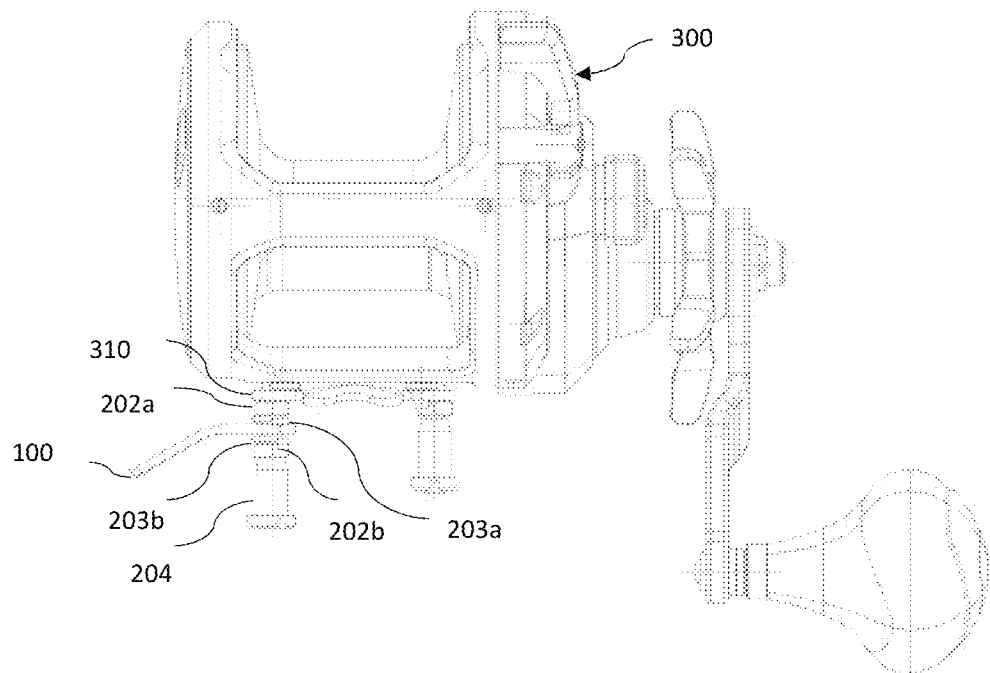
FIG. 5 is a side view of the second configuration of the fastening assembly for securing the first embodiment of the adaptor to the fishing reel.

In a second configuration of the fastening assembly shown in FIG. 5, two primary female fasteners 202a, 202b and two washers 203a, 203b are applied to prevent loosening of the first embodiment of the adaptor 100 from the male fastener 201. The first washer 203a is disposed in between the first primary female fastener 202a and a first surface of the plate, and a second washer 203b is disposed on another surface of the plate. The first primary female fastener 202a is positioned closest to the foot portion 310 of the fishing reel 300. In this configuration, the second primary female fastener 202b is adjacent to the second washer 203b. In addition, the secondary female fastener 204 is configured to enclose the end portion of the male fastener 201.

Figure 6:
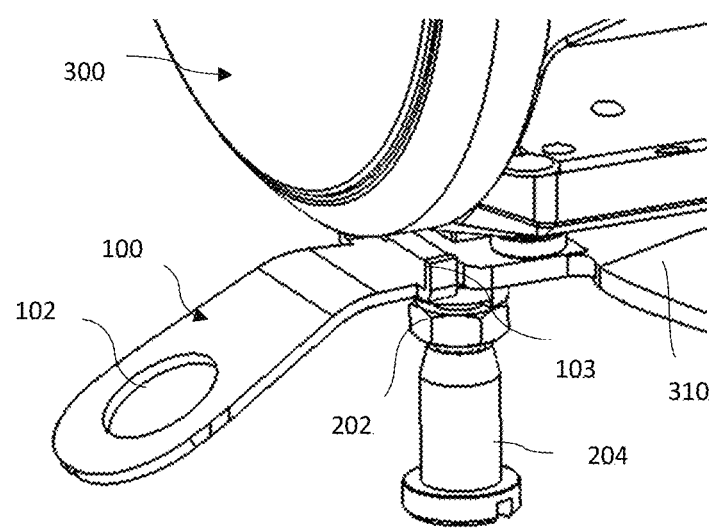
FIG. 6 is a perspective view of another configuration of the fastening assembly for securing the second embodiment of the adaptor to the fishing reel.

According to FIG. 6 that shows another configuration of the fastening assembly to secure the second embodiment of the adaptor 100 to the fishing reel 300, no washer 203 is applied since the adaptor 100 is equipped with stoppers 103. It is however understood that washer 203 is still applicable when necessary or desired for load distribution to reduce vibration of the adaptor 100 and any or both of the female fasteners 202, 204. The adaptor 100 being closest to the foot portion 310 of the fishing reel 300 has its stoppers in contact with the foot portion 310 for stabilizing the adaptor 100. In FIG. 6, it can be seen that the foot portion 310 and the mounting portion 110 of the adaptor 100 are in a stacked manner, with the side surface of each stopper 103 being in contact with the foot portion 310. The primary female fastener 202 is positioned in between the adapter 100 and the secondary female fastener 204.

To facilitate disassembling and assembling of the adaptor 100 and female fasteners 202, 204 around the male fastener 201, threaded fasteners are preferred to be used with the male fastener 201 having threads on its external surface and the female fasteners 202, 204 having threads on its internal surface. When a threaded male fastener 201 is used, the profile and dimension of the inner periphery of the first opening 101 need to correspond to the threads on the male fastener to allow engagement of the adaptor 100 to the male fastener 201. It is understood that the fastening assembly is not limited to using threaded fasteners, non-threaded fasteners are also applicable. Examples of male fasteners 201 include bolt, screw, stud, boss and pin. Nuts are used as the female fasteners 202, 204, whereas the preferred washer 203 is a spring washer.

The adaptor 100 is most preferred to be fabricated by stamping process. However, processes such as casting, forging, molding are also applicable to fabricate the adaptor 100. The preferred casting process is die casting and the preferred molding process is injection molding.

Although the description above contains many specifications, it is understood that the embodiments of the preferred form are not to be regarded as a departure from the invention and it can be modified within the scope of the appended claims.

What is claimed is:

1. An adaptor for securing an equipment to a fishing reel, comprising:
   a plate including a first portion, a second portion, and a curved portion, the first portion having a first opening configured to receive a male fastener of a fastening assembly to be mounted onto the fishing reel, the second portion being a flat portion having a second opening configured to receive the equipment, the curved portion being curved and connecting the first portion and the second portion to be inclined at an angle relative to each other; and
   a pair of stoppers formed at opposing sides of the first portion of the plate, the stoppers protruding in a direction perpendicular to a surface of the plate so as to contact a foot portion of the fishing reel.

2. The adaptor according to claim 1, wherein the adaptor is configured to be mounted on the foot portion of the fishing reel through the pair of stoppers.

3. The adaptor according to claim 1, wherein the equipment includes any one or a combination of a line, strap, string, chain, rope, hook, ring and clip.

4. An adaptor kit for securing an equipment to a fishing reel, comprising:
   an adaptor including a plate and a pair of stoppers, the plate including a first portion, a second portion, and a curved portion, the first portion having a first opening, the second portion being a flat portion having a second opening configured to receive the equipment, the curved portion being curved and connecting the first portion and the second portion to be inclined at an angle relative to each other, the pair of stoppers formed at opposing sides of the first portion of the plate, the stoppers protruding in a direction perpendicular to a surface of the plate so as to contact a foot portion of the fishing reel; and
   a fastening assembly including a male fastener to be inserted through the first opening of the adaptor to mount the plate onto the fishing reel.

5. The adaptor kit according to claim 4, wherein the fastening assembly further includes any one or a combination of a primary female fastener configured to secure the plate to the male fastener, a washer disposed in between the primary female fastener and the plate, and a secondary female fastener being disposed adjacent to the primary female fastener and configured to enclose an end portion of the male fastener.

6. The adaptor kit according to claim 4, wherein the fastening assembly further includes any one or a combination of a first primary female fastener, first washer disposed in between the first primary female fastener and a first surface of the plate, a second washer disposed on a second surface of the plate, a second primary female fastener being disposed adjacent to the second washer, and a secondary female fastener configured to enclose an end portion of the male fastener.

7. The adaptor kit according to claim 4, wherein the equipment includes any one or a combination of a line, strap, string, chain, rope, hook, ring and clip.

8. The adaptor according to claim 1, wherein each of the pair of stoppers includes a first stopper portion extending from the plate and a second stopper portion protruding from the first stopper portion in the direction perpendicular to the surface of the plate.

9. The adaptor kit according to claim 4, wherein each of the pair of stoppers includes a first stopper portion extending from the plate and a second stopper portion protruding from the first stopper portion in the direction perpendicular to the surface of the plate.

\* \* \* \* \*